Figure 1:
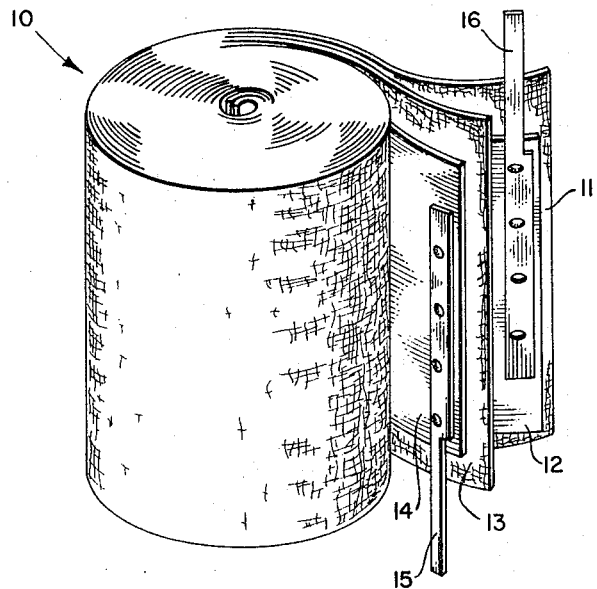

United States Patent Office 3,303,143
Patented Feb. 7, 1967

3,303,143
ELECTROLYTE FOR ELECTROLYTIC CAPACITOR
Harold D. Shepherd, Indianapolis, Ind., and James A. Carter, Huntsville, Ala., assignors to P. R. Mallory Co., Inc., Indianapolis, Ind., a corporation of Delaware
Filed Apr. 9, 1965, Ser. No. 446,872
5 Claims. (Cl. 252—62.2)

This is a continuation-in-part of application Serial No. 285,444, filed June 3, 1963, now abandoned.

This invention relates to electrolytes for electrolytic devices and has specific pertinence to an improved low temperature electrolyte designed for use in capacitors.

It has long been known that film-forming metals such as aluminum can be anodized to provide an extremely thin oxide film thereon having excellent dielectric properties. It is furthermore well known that metal foils possessing such dielectric oxide films can be advantageously employed in the manufacture of capacitors.

Those skilled in the art are aware that virtually every dielectric oxide film formed by conventional electroforming techniques is possessed of numerous imperfections and irregularities which increase the leakage current and reduce the dielectric strength in capacitors. The addition of an electrolyte serves not only as a conductive solution for transporting electrical charges between the anode and the cathode, but also provides oxygen for repair of the imperfect anodic dielectric film.

Among the many desirable characteristics of a capacitor electrolyte, perhaps the most difficult to achieve is stability of resistance throughout a broad range of operating temperatures. This problem is most acute in the low temperature range, for example, between —40° C. and —55° C. A widely used electrolyte solution of ammonium borate and ethylene glycol undergoes radical changes in electrical characteristics at such reduced temperature levels. The specific resistance is found to increase at a rapid rate, with the result that capacitor performance and life characteristics are seriously impaired.

In the present invention, there is disclosed an electrolyte which exhibits a high degree of resistance stability throughout a wide range of temperatures, viz., from —55° C. to 125° C. It has been found that by dissolving a particular inorganic salt of picric acid in a suitable glycol ether, an electrolyte with superior low temperature characteristics is realized. The inorganic salt employed herein is ammonium picrate and the solvent may be ethylene glycol monomethyl ether or the equivalent thereof. The superiority of this new electrolyte over contemporary electrolytes will become apparent as the present description progresses.

It is an object of the present invention, therefore, to provide a capacitor electrolyte which possesses a high degree of resistance stability throughout a temperature range of approximately —55° C. to 125° C.

It is a further object of the present invention to provide an electrolyte which exhibits a relatively low specific resistance at temperatures as low as —55° C.

Another object of the present invention is to provide an electrolyte which will produce improved electrical characteristics in a capacitor operating in the approximate temperature range of —55° C. to 125° C.

Yet another object of the present invention is to provide an improved low-water-content electrolyte which, when incorporated into a capacitor of the wound foil type, will afford excellent life characteristics to said capacitor.

Still another object of the present invention is to disclose an improved low-water-content electrolyte comprising an inorganic salt of picric acid dissolved in a suitable glycol ether.

Still another object of the present invention is to provide an improved low-water-content electrolyte which is readily adaptable for use in capacitors of the wound foil type.

Yet another object of the present invention is to provide an improved electrolyte which can be easily prepared and handled.

Still another object of the present invention is to provide an improved electrolyte which comprises inexpensive and readily available constituents.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing and wherein like reference characters describe elements of similar function therein and wherein the scope of the invention is determined rather from the dependent claims.

In the drawing:

FIGURE 1 is a perspective view of a partially unwound electrolytic capacitor body to which the present invention is applicable.

Figure 2:
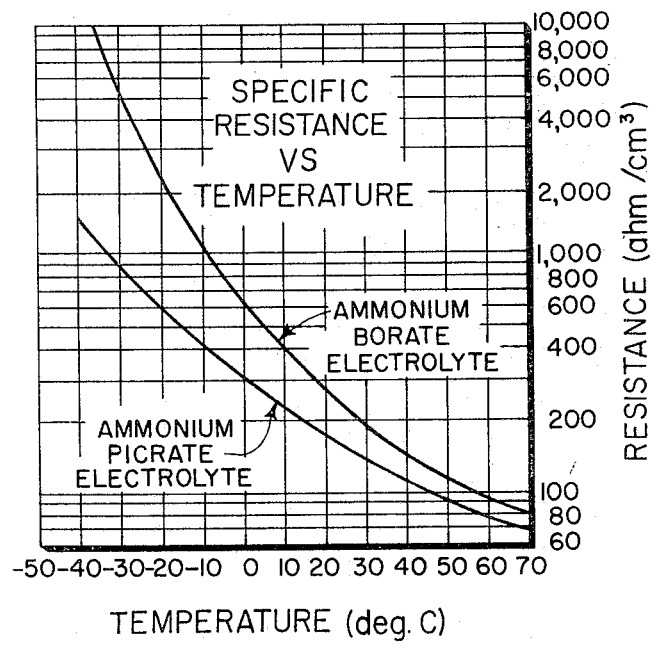

FIGURE 2 presents a curve of specific resistance vs. temperature for two electrolytes, one of which is disclosed by the present invention.

Referring now to the drawing, FIGURE 1 presents an electrolytic capacitor of the wound foil type denoted generally by reference numeral 10. Capacitor 10 comprises anode 12 of aluminum having on its surface an oxide film which functions as the active dielectric for the capacitor. Said dielectric oxide film is formed on aluminum anode 12 in accordance with accepted anodization techniques. Cathode 14 may be composed of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 16 and 15, respectively, to serve as terminals for capacitor 10; tabs 15 and 16 may extend from the same or opposite ends of the capacitor.

FIGURE 2 presents a graphic comparison of the specific resistance characteristics of two electrolytes at varying temperature. One curve illustrates the performance of a solution of ammonium borate and ethylene glycol, a well known low temperature electrolyte. The other curve illustrates the performance of a solution of ammonium picrate and ethylene glycol monomethyl ether, an improved low temperature electrolyte taught by the present invention. From these curves, therefore, it is readily apparent that the ammonium picrate electrolyte of the present invention affords substantially greater resistance stability throughout the temperature range. The ammonium picrate electrolyte is especially advantageous at extreme temperatures such as —40° C., where it is observed that ammonium borate exhibits a radical increase in specific resistance. A capacitor embodying the ammonium picrate electrolyte will have substantially greater capacitance below —40° C. than one containing the ammonium borate electrolyte.

The electrolyte of the present invention consists of a mixture of picric acid, anhydrous ammonia, and water, dissolved in a glycol ether. Examples of a suitable glycol ether would include ethylene glycol monomethyl ether or diethylene glycol monoethyl ether.

It is seen that the picric acid and anhydrous ammonia would react chemically in accordance with the following equation:

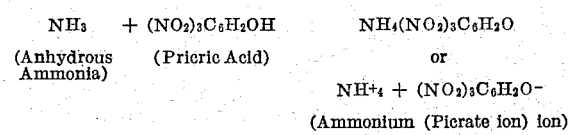

It is known that the commercially available acid sold as reagent grade picric acid by J. T. Baker & Co. contains 10% water due to the unstable nature of the acid. Therefore, each gram of the reagent grade picric acid used in the present invention actually contains .9 gram of picric acid and .1 gram of water.

It was found that for every 100 grams of glycol ether solvent if more than 30 grams of ammonium picrate were mixed with the solvent, the ammonium picrate begins to precipitate out of solution. As disclosed hereinbefore, the 30 grams of the reagent grade picric acid actually contains 10% water, that is, 3 grams of water and 27 grams of picric acid.

By way of illustration the following equation may be utilized to calculate the number of grams of ammonium picrate present if 30 grams of reagent grade picric acid are utilized.

$$\frac{\text{actual grams of picric acid}}{\text{molecular weight of picric acid}} =$$

$$\frac{\text{grams of ammonium picrate}}{\text{molecular weight of ammonium picrate}}$$

$$\frac{27 \text{ grams}}{229.11 \text{ molecular weight}} = \frac{x \text{ grams of ammonium picrate}}{246.11 \text{ molecular weight}}$$

$$x = 29.0 \text{ grams of ammonium picrate}$$

The total weight of the electrolyte is calculated as follows:

| | Grams |
|---|---|
| Water | 3 |
| Solvent (glycol ether) | 100 |
| Ammonium picrate | 29 |
| Electrolyte | 132 |

$$\frac{3 \text{ grams of water}}{132 \text{ grams of electrolyte}} = 2.2727\% \text{ by weight of water}$$

$$\frac{29 \text{ grams of ammonium picrate}}{132 \text{ grams of electrolyte}} =$$

$$21.9697\% \text{ by weight of ammonium picrate}$$

$$\frac{100 \text{ grams of glycol ether}}{132 \text{ grams of electrolyte}} =$$

$$72.7576\% \text{ by weight of ammonium picrate}$$

The lower limit is calculated by using 2 grams of reagent grade picric acid, that is, 1.8 gram of picric acid and .2 gram of water. It was found that if less than 2 grams of reagent grade picric is used per 100 grams of solvent, glycol ether, the resistance of the electrolyte is such that the capacitor is of no practical value. The lower limits of the ammonium picrate, the water, and the glycol ether by weights may be calculated utilizing the aforementioned chemical relationships. In so doing it was found that the limits of the ammonium picrate in a glycol ether are as follows:

| | Percent by weight |
|---|---|
| Ammonium picrate | 1.890–21.9697 |
| Water | .196– 2.2727 |
| Solvent, glycol ether | 97.914–75.7576 |

Although it was found that the weight percentage of ammonium picrate utilized in the electrolyte may vary rather widely for capacitor applications, a typical electrolyte solution having excellent properties would result if 20 grams of reagent grade picric acid was utilized, that is, composed of 18 grams of picric acid and 2 grams of water. The electrolyte consists of about:

| | Percent by weight |
|---|---|
| Ammonium picrate | 15.9386 |
| Water | 1.6483 |
| Ethylene glycol monomethyl ether | 82.4131 |

Numerous aluminum capacitors utilizing the electrolyte of the present invention were subjected to life tests and low temperature performance tests. The following examples will serve to illustrate the superiority of this electrolyte.

*Example 1*

Five capacitors of the anodized aluminum foil type were impregnated with an ammonium picrate electrolyte of the present invention and the foils were convolutely wound in the usual manner. The electrolyte solution consisted of about 15.94% by weight of ammonium picrate, 1.65% by weight of water, and 82.41% by weight of ethylene glycol monomethyl ether. Each capacitor was subjected to a 2000-hour life test at 125° C. and 60 volts. The following table shows comparative data before and after the test:

| Test Hours | Temperature, ° C. | Capacity, mfd. | Dissipation Factor, Percent | Leakage Current, Micro-Amps after 3 min. of 60 volts |
|---|---|---|---|---|
| 0 | 125 | 52.8 | −5.8 | 5.0 |
| 2,000 | 125 | 49.1 | −6.7 | 0.36 |

*Example 2*

Five more capacitors of the type described in Example 1 were subjected to a 5000-hour life test at 85° C. and 60 volts. A comparison of initial and final data is presented in the following table:

| Test Hours | Temperature, ° C. | Capacity, mfd. | Dissipation Factor, Percent | Leakage Current, Micro-Amps after 3 min. of 60 volts |
|---|---|---|---|---|
| 0 | 85 | 51.8 | −6.2 | 3.3 |
| 5,000 | 85 | 50.0 | −5.5 | 0.16 |

*Example 3*

Five additional capacitors of the type described in Example 1 were subjected to a low temperature performance test. The following data presents a comparison of the electrical characteristics at room temperature and at −55° C.

| Temperature, ° C. | Capacity, mfd. | Dissipation Factor, Percent |
|---|---|---|
| Room | 55.7 | −3.9 |
| −55 | 46.0 | −10.7 |

It was found that a .5 molar solution of lithium picrate prepared by dissolving 10.95 grams of reagent grade picric acid and 2.7 grams of Chemical Pure grade lithium hydroxide monohydrate in 100 milliliters of electrolytic grade ethylene glycol was unsatisfactory.

Six separate and distinct aluminum capacitors were impregnated with the lithium picrate electrolyte and aged for 15 minutes at 40 volts D.C. at room temperature.

The electrical characteristics of the capacitors were as follows:

Capacitance, microfarads _____ 136–138
Effective series resistance, ohms _____ .43–.51
D.C. leakage, microamperes _____ 16–30

The aluminum capacitance units were placed in an 125±3° C. oven at 30 volts D.C. for a life test. Within 24 hours of operation, all six units had exploded showing that the above-mentioned lithium picrate electrolyte is not a satisfactory electrolyte for aluminum capacitors.

The electrolyte of the present invention as hereinbefore described in one of its embodiments is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

What is claimed is:
1. An electrolytic capacitor electrolyte consisting of from about 1.89% to 21.97% by weight of ammonium picrate, from about .2% to 2.27% by weight of water, and from about 97.91% to 75.76% by weight of a glycol ether.

2. An electrolytic capacitor electrolyte consisting of from about 1.89% to 21.97% by weight of ammonium picrate, from about .2% to 2.27% by weight of water, and from about 97.91% to 75.76% by weight of an ethylene glycol monomethyl ether.

3. An electrolytic capacitor electrolyte consisting of from about 1.89% to 21.97% by weight of ammonium picrate, from about .2% to 2.27% by weight of water, and from about 97.91% to 75.76% by weight of a diethylene glycol monoethyl ether.

4. An electrolytic capacitor electrolyte consisting of from about 1.89% to 21.97% by weight of ammonium picrate, from about .2% to 2.27% by weight of water, and from about 97.91% to 75.76% by weight of ethylene glycol monoethyl ether.

5. An electrolytic capacitor electrolyte consisting of about 15.94% by weight of ammonium picrate, about 1.65% by weight of water, and about 82.41% by weight of ethylene glycol monomethyl ether.

References Cited by the Examiner

UNITED STATES PATENTS

| | | | |
|---|---|---|---|
| 2,253,506 | 8/1941 | Clark | 252—62.2 |
| 2,253,507 | 8/1941 | Clark | 252—62.2 |
| 2,759,132 | 8/1956 | Ross | 252—62.2 |
| 2,886,527 | 5/1959 | Myers | 252—62.2 |
| 2,886,528 | 5/1959 | Myers | 252—62.2 |

TOBIAS E. LEVOW, *Primary Examiner.*

R. D. EDMONDS, *Assistant Examiner.*